Oct. 27, 1970     J. H. WINZELER ET AL     3,535,948
WORM GEARING
Filed Nov. 29, 1968
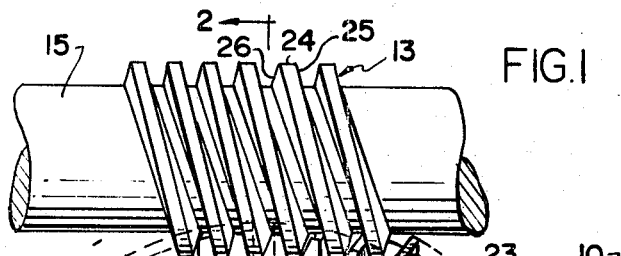
FIG.1
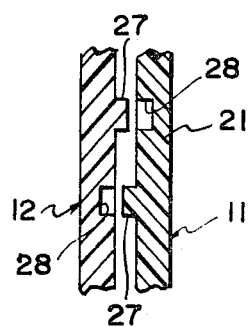
FIG.3
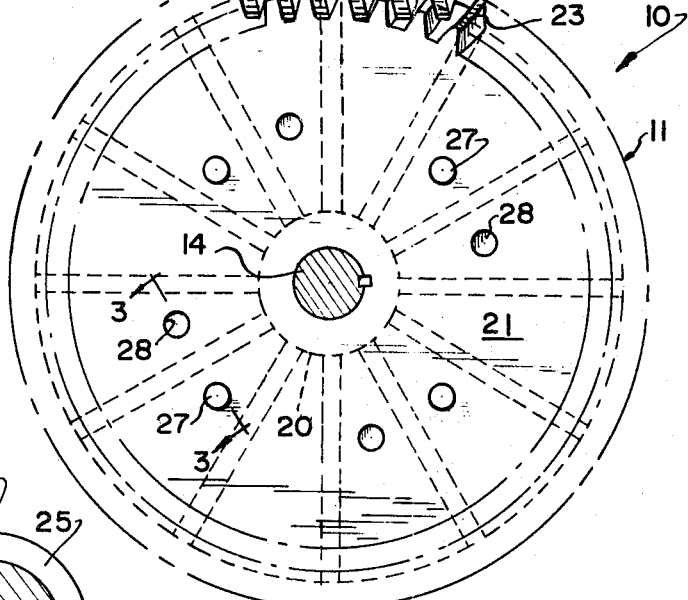
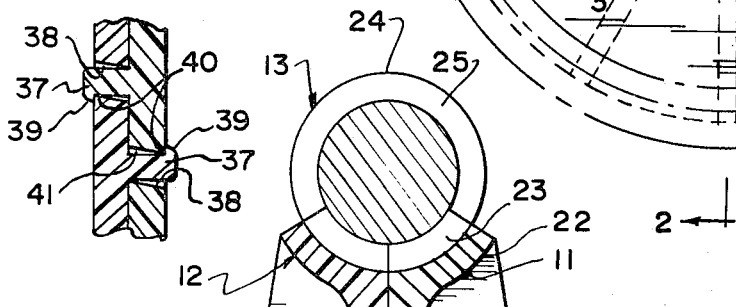
FIG.5
FIG.2
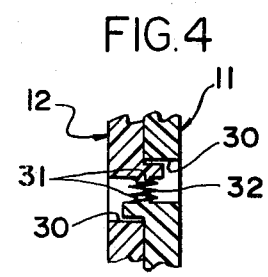
FIG.4
INVENTORS
JOHN HAROLD WINZELER
FRANK J. RYCHLIK
BY   *Ray E. Snyder*
ATTORNEY United States Patent Office 3,535,948
Patented Oct. 27, 1970

3,535,948
WORM GEARING
John Harold Winzeler, 624 Surrey Lane, Glenview, Ill. 60025, and Frank J. Rychlik, 3484 Whirlaway Drive, Northbrook, Ill. 60062
Filed Nov. 29, 1968, Ser. No. 779,718
Int. Cl. F16h 1/16, 55/14, 55/18
U.S. Cl. 74—440    1 Claim

ABSTRACT OF THE DISCLOSURE

A molded plastic worm wheel gear that can be stripped readily from a single mold and adapted to be bonded or otherwise attached to a second identical worm wheel gear to form an enveloping or retaining structure for a roll-formed worm gear.

BACKGROUND OF THE INVENTION

Field of the invention

This invention relates to machine elements and mechanisms and more particularly to gearing of the worm type and manufactured by a plastic injection and/or compression molding process. This type of gearing may be used in many applications where high speed reduction and quiet operation are desirable, as for example, in automatic can opening machines and the like.

Description of the prior art

Worm gearing per se is well known in the art and is useful in many applications where it is desirable to produce a large speed reduction, and to change the plane of rotation. One disadvantage of such type of gearing is that the gears tend to disengage due to axial or radial thrust or movement of the worm wheel with respect to the worm gear. This disadvantage can be overcome effectively by restraining the axial or lateral movement of the worm wheel shaft, which increases the thrust on the shaft bearings, or by providing oppositely facing worm wheels attached together and contacting the worm gear on opposite sides. It is desirable also be provide worm wheel gears having long curved contact surface with the worm gear. Cutting such gears is time consuming and expensive. It is far more economical to mold such gears from suitable plastic material. A single gear of this general type is shown in the patent to J. E. Holt, No. 2,812,668. The gear taught by Holt is a Composite Worm-Helical Gear Construction manufactured by a molding process, but is not designed to be attached to a second identical gear to form a worm gear engaging and enveloping structure.

SUMMARY OF THE INVENTION

It is an object to provide a worm wheel gear structure formed by an injection or compression molding process of plastic material and adapted to be attached or bonded to an oppositely facing identical worm wheel to form an enveloping structure for a meshing worm gear. The meshing worm gear preferably is roll-formed rather than cut so as to eliminate the milling marks inherent in the cutting process and thereby eliminate noise and vibration caused by contact of such marks with the worm wheel gears. If desired, the worm wheels may be formed from a pattern or impression made from a mating roll-formed worm gear.

It is another object to eliminate play or backlash in applications where reversible operation is required or desired by coupling the worm wheel gears of the present invention together with suitable resilient or bias means so as to maintain the teeth of the worm wheel gears in constant contact with opposite sides of the worm gear teeth.

BRIEF DESCRIPTION OF THE DRAWINGS

FIG. 1 is a side view of the worm wheel of the present invention and a meshing worm gear;

FIG. 2 is an end view taken on line 2—2 of FIG. 1 and showing how two worm wheels are bonded together to mesh with the worm gear;

FIG. 3 is an enlarged sectional view showing indexing parts for the worm wheels;

FIG. 4 is an enlarged sectional view showing an alternative construction for the elimination of play and producing a pair of anti-backlash worm gears; and FIG. 5 is a modification of the structure of FIG. 4 utilizing the natural resiliency of the plastic material to lock the worm wheels together.

Like characters of reference designate like parts in the several views.

DESCRIPTION OF THE PREFERRED EMBODIMENT

The total gear structure of the present invention is designated generally by the numeral 10 and comprises worm wheels 11 and 12 meshing with a worm gear 13. The gears 11 and 12 are mounted or carried on a rotatable shaft 14 and the worm gear 13 is formed on or carried by a shaft 15.

The worm wheel gear 11 comprises a hub 20 attached to the shaft 14 by a keyway or other suitable means, a web or spoke structure 21, and an outer rim 22. The rim 22 is formed with curved teeth 23 designed to mesh with teeth 24 of the worm gear 13. The gear teeth 24 have opposite side surface 25 and 26. The teeth 23 may engage an arcuate section of the worm gear 13 of about 60°.

The worm wheel 11 may also be formed with indexing bosses or pins 27 and mating depressions or holes 28. The bosses 27 may all be of the same size or may be of different sizes so long as there is a mating depression 28 of a corresponding size. It is contemplated that the worm wheels 11 and 12 shall be molded in the same mold, and when placed in an oppositely facing orientation, the bosses 27 and depressions 28 shall intermesh to ensure exact registry of the gear teeth 23.

The worm wheels 11 and 12 may be molded of any suitable plastic gear material such as, nylon, Delrin, Nylatron, and Fiberglas reinforced composites. The plastic material may also contain a small percentage of molybdenum disulphide to render the gears self-lubricating. Since the gears are made of plastic, they may be bonded together by a sonic welding process, or by means of a suitable adhesive.

When bonded together, the worm wheels 11 and 12 effectively envelope the worm gear 13 and retain it from lateral movement. The combined worm wheels 11 and 12 also persent a long tooth contact surface along the combined lengths of the teeth 23, thereby minimizing the pressure at any point on a tooth and hence reducing the tendency to strip the gear teeth 23.

In applications where it is desirable to have reversible operation and eliminate play or backlash in the meshing of the gears for either direction of rotation, the modification shown in FIG. 4 may be employed. Instead of bonding the worm wheels 11 and 12 together, they are each provided with a single or a plurality of apertures or windows 30 in the web 21. Each window is formed with a retaining tooth 31 for locating and holding a spring 32 or other suitable resilient means. The spring 32 tends to turn the worm wheels 11 and 12 in opposite directions so that the teeth 23 are biased into contact with the opposite sides 25 and 26 of the worm gear teeth 24. The locating bosses 27 and depressions 28 may still be present provided there is sufficient clearance to allow minute angular motion relatively between the worm wheels 11 and 12. This arrangement is effective to take up any play or backlash in motion when the direction of rotation of shaft 15 is reversed, or when the speed of the worm wheels 11 and 12 exceed the speed of the worm gear 13.

An alternative construction that may be employed is shown in FIG. 5. In this modification, the indexing pins 36 and the holes 38 are elongated to extend through the thickness of web 21. A pin 37 is formed with a shoulder or latch 39 adapted to engage the lip 40 of a hole 38. The inner walls 41 of the holes 38 may be slanted, as shown in exaggerated form in FIG. 5, to bend the pins 37 slightly when joining the two worm wheels together, and thereby facilitate the latching of 39 on to 40. This arrangement takes advantage of the natural resiliency of the plastic material for effectively joining the worm wheels 11 and 12 together and may also provide the bias for causing relative displacement of the worm wheels to eliminate backlash.

The gear teeth 23 may be cut originally to match the pitch of a desired worm gear 13 to form a pattern for a mold. However, we prefer that the worm gear 13 be formed first to the proper pitch by a roll-forming process and this gear be used as a pattern for the teeth 23 of the worm wheel 11. The roll-formed gears do not have the mill marks found on cut gears and hence are generally quieter in operation.

There has been shown and described by this invention a novel type of worm wheel gear structure made by joining together two oppositely facing worm wheel gears, each formed in a single or identical mold, to define a worm gear enveloping structure. It is to be understood that the embodiment shown and described is by way of example only, and the invention is not to be considered as limited thereto except insofar as the claim may be so limited.

We claim:
1. A molded plastic worm wheel gear structure adapted to mesh with a mating worm gear and comprising:
 a first molded worm wheel gear having a hub, a rim, a supporting web joining the hub and rim, and worm gear engaging teeth formed on the rim;
 a second identical worm wheel gear disposed in an oppositely facing orientation with respect to the first worm wheel gear and forming a worm gear enveloping structure for a single worm gear;
 indexing means formed integrally with said worm wheel gears to ensure exact registry of the worm gear engaging teeth;
 said first worm wheel gear formed with axially extending pins of a length greater than the axial thickness of said web and with holes extending through said web;
 said second worm wheel also formed with axially extending pins of a length greater than the axial thickness of said web and with holes extending axially through said web;
 latching means formed integrally with said pins whereby said worm wheels are effectively locked together by placing them in an oppositely facing relationship and allowing said pins to extend completely through said holes;
 said pins having a flexibility inherent in the material of which said worm wheel gears are molded; and
 the interior walls of said holes being slanted with respect to said engaging pins whereby said worm wheel gears are biased to engage opposite sides of the teeth of a meshing worm gear.

References Cited

UNITED STATES PATENTS

| | | | |
|---|---|---|---|
| 2,310,232 | 2/1943 | Hale | 74—440 |
| 2,845,809 | 8/1958 | Hetzel | 74—440 |
| 2,951,053 | 8/1960 | Reuter et al. | 260—28 |
| 2,976,741 | 3/1961 | Martin | 74—432 |
| 3,127,784 | 4/1964 | O'Neill | 74—440 |
| 3,174,356 | 3/1965 | Michalec | 74—440 |
| 3,429,700 | 2/1969 | Wiegand et al. | 29—159.2 X |

LEONARD H. GERIN, Primary Examiner

U.S. Cl. X.R.

29—159.2; 74—425, 443